(12) United States Patent
George et al.

(10) Patent No.: US 11,110,956 B2
(45) Date of Patent: Sep. 7, 2021

(54) QUADRANT BASED FRICTION COMPENSATION FOR TIRE LOAD ESTIMATION IN STEERING SYSTEMS

(71) Applicant: STEERING SOLUTIONS IP HOLDING CORPORATION, Saginaw, MI (US)

(72) Inventors: Mariam Swetha George, Midland, MI (US); Tejas M. Varunjikar, Troy, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 271 days.

(21) Appl. No.: 16/276,359

(22) Filed: Feb. 14, 2019

(65) Prior Publication Data

US 2019/0256126 A1    Aug. 22, 2019

Related U.S. Application Data

(60) Provisional application No. 62/633,829, filed on Feb. 22, 2018.

(51) Int. Cl.
*B62D 5/04* (2006.01)
*B62D 6/00* (2006.01)
(Continued)

(52) U.S. Cl.
CPC ........... *B62D 5/0463* (2013.01); *B62D 5/006* (2013.01); *B62D 5/0481* (2013.01); *B62D 6/007* (2013.01);
(Continued)

(58) Field of Classification Search
CPC .. B62D 5/0463; B62D 5/0481; B62D 5/0409; B62D 6/007; B62D 6/008; G01M 17/02
See application file for complete search history.

(56) References Cited

U.S. PATENT DOCUMENTS

| 5,828,973 A | 10/1998 | Takeuchi et al. |
| 6,134,490 A | 10/2000 | Ito et al. |

(Continued)

FOREIGN PATENT DOCUMENTS

| CN | 101863283 A | 10/2010 |
| CN | 105197015 A | 12/2015 |

(Continued)

OTHER PUBLICATIONS

Chinese Office Action and Search Report from the Chinese Patent Office for related Chinese Patent Application No. 20190134193.2 dated Mar. 26, 2021, 6 page(s).

(Continued)

*Primary Examiner* — Geepy Pe
*Assistant Examiner* — Kyle J Kingsland
(74) *Attorney, Agent, or Firm* — Dickinson Wright PLLC

(57) ABSTRACT

According to one or more embodiments a control system for a steering system, includes a control module that estimates a tire load by performing a method that includes receiving, as an input torque, motor-torque that is generated by a motor of the steering system. The method further includes computing an efficiency factor for a gear of the steering system based on the input torque and a motor velocity. The method further includes adjusting the input torque by scaling the input torque with the efficiency factor. The method further includes estimating the tire load using the adjusted input torque as an input to a state observer for the steering system.

20 Claims, 12 Drawing Sheets

(51) Int. Cl.
  *B62D 5/00* (2006.01)
  *G01M 17/02* (2006.01)
(52) U.S. Cl.
  CPC .............. *B62D 6/008* (2013.01); *G01M 17/02*
          (2013.01); *B62D 5/0409* (2013.01)

(56) References Cited

U.S. PATENT DOCUMENTS

| | | |
|---|---|---|
| 8,434,583 B2 | 5/2013 | Wilson-Jones et al. |
| 2003/0024759 A1 | 2/2003 | Williams et al. |
| 2004/0019417 A1 | 1/2004 | Yasui et al. |
| 2008/0097668 A1 | 4/2008 | Tsuchiya |
| 2008/0114515 A1 | 5/2008 | Hara |
| 2008/0142293 A1 | 6/2008 | Goto et al. |
| 2008/0294313 A1 | 11/2008 | Aoki et al. |
| 2009/0157258 A1 | 6/2009 | Hales et al. |
| 2009/0192679 A1 | 7/2009 | Kobayashi et al. |
| 2009/0271069 A1 | 10/2009 | Yamamoto et al. |
| 2011/0093164 A1 | 4/2011 | Kobayashi |
| 2012/0191301 A1 | 7/2012 | Benyo et al. |
| 2013/0073146 A1 | 3/2013 | Konomi et al. |
| 2013/0253770 A1 | 9/2013 | Nishikawa et al. |
| 2013/0261894 A1 | 10/2013 | Kojima |
| 2014/0149000 A1 | 5/2014 | Tamura et al. |
| 2015/0367884 A1 | 12/2015 | George et al. |
| 2016/0001810 A1* | 1/2016 | Tsubaki .................. B62D 6/08 701/42 |

FOREIGN PATENT DOCUMENTS

| | | |
|---|---|---|
| CN | 106004881 A | 10/2016 |
| CN | 10780254 A | 11/2017 |
| DE | 102009002706 A1 | 11/2010 |
| DE | 102014205321 A1 | 9/2015 |
| EP | 1275937 A2 | 1/2003 |
| EP | 1640246 A2 | 3/2006 |
| EP | 2177421 A2 | 4/2010 |
| EP | 2735495 A2 | 5/2014 |
| JP | 5081123 B2 | 11/2012 |

OTHER PUBLICATIONS

Official Letter from the German Patent and Trademark Office for related German Patent Application No. 102019104169.4 dated May 19, 2021, 10 page(s).

* cited by examiner

QUADRANT BASED FRICTION COMPENSATION FOR TIRE LOAD ESTIMATION IN STEERING SYSTEMS

CROSS-REFERENCES TO RELATED APPLICATIONS

This patent application claims priority to U.S. Provisional Patent Application Ser. No. 62/633,829, filed Feb. 22, 2018, and which is incorporated herein by reference in its entirety.

BACKGROUND

Typically, when operating a vehicle, such as a car, an operator that steers the vehicle has at least two responsibilities, one to follow an intended path, and a second to compensate for road disturbances. For the latter task, the driver compensates, for example, by counteracting at a steering wheel of the vehicle, the counteraction being adequate disturbance attenuation in response to the road disturbance. However, such kind of road disturbance typically comes as a surprise to the driver. It is desirable that the driver be responsible only for the task of path following, and accordingly to decouple the driver from the road disturbances. However such decoupling mandates estimating the tire load in a manner that is robust to road surface friction and vehicle speed. Therefore, estimating tire load becomes vital to vehicle dynamics control.

SUMMARY

Technical solutions are described for a power steering system of a vehicle to account for friction based efficiency loss in a steering gear. By accounting for asymmetric efficiency, the technical solutions described herein facilitates an improved prediction of a tire load because of an improved parametrisation of an observer module, and also due to an improved friction estimation module.

According to one or more embodiments a control system for a steering system, includes a control module that estimates a tire load by performing a method that includes receiving, as an input torque, motor-torque that is generated by a motor of the steering system. The method further includes computing an efficiency factor for a gear of the steering system based on the input torque and a motor velocity. The method further includes adjusting the input torque by scaling the input torque with the efficiency factor. The method further includes estimating the tire load using the adjusted input torque as an input to a state observer for the steering system.

According to one or more embodiments, a method to estimate a tire load in a steering system includes receiving, as an input torque, motor-torque that is generated by a motor of the steering system. The method further includes computing an efficiency factor for a gear of the steering system based on the input torque and a motor velocity. The method further includes adjusting the input torque by scaling the input torque with the efficiency factor. The method further includes estimating the tire load using the adjusted input torque as an input to a state observer for the steering system.

According to one or more embodiments a steering system includes a steering gear, and a processor to compute a tire load estimate by performing a method that includes receiving, as an input torque, motor-torque that is generated by a motor of the steering system. The method further includes computing an efficiency factor for a gear of the steering system based on the input torque and a motor velocity. The method further includes adjusting the input torque by scaling the input torque with the efficiency factor. The method further includes estimating the tire load using the adjusted input torque as an input to a state observer for the steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
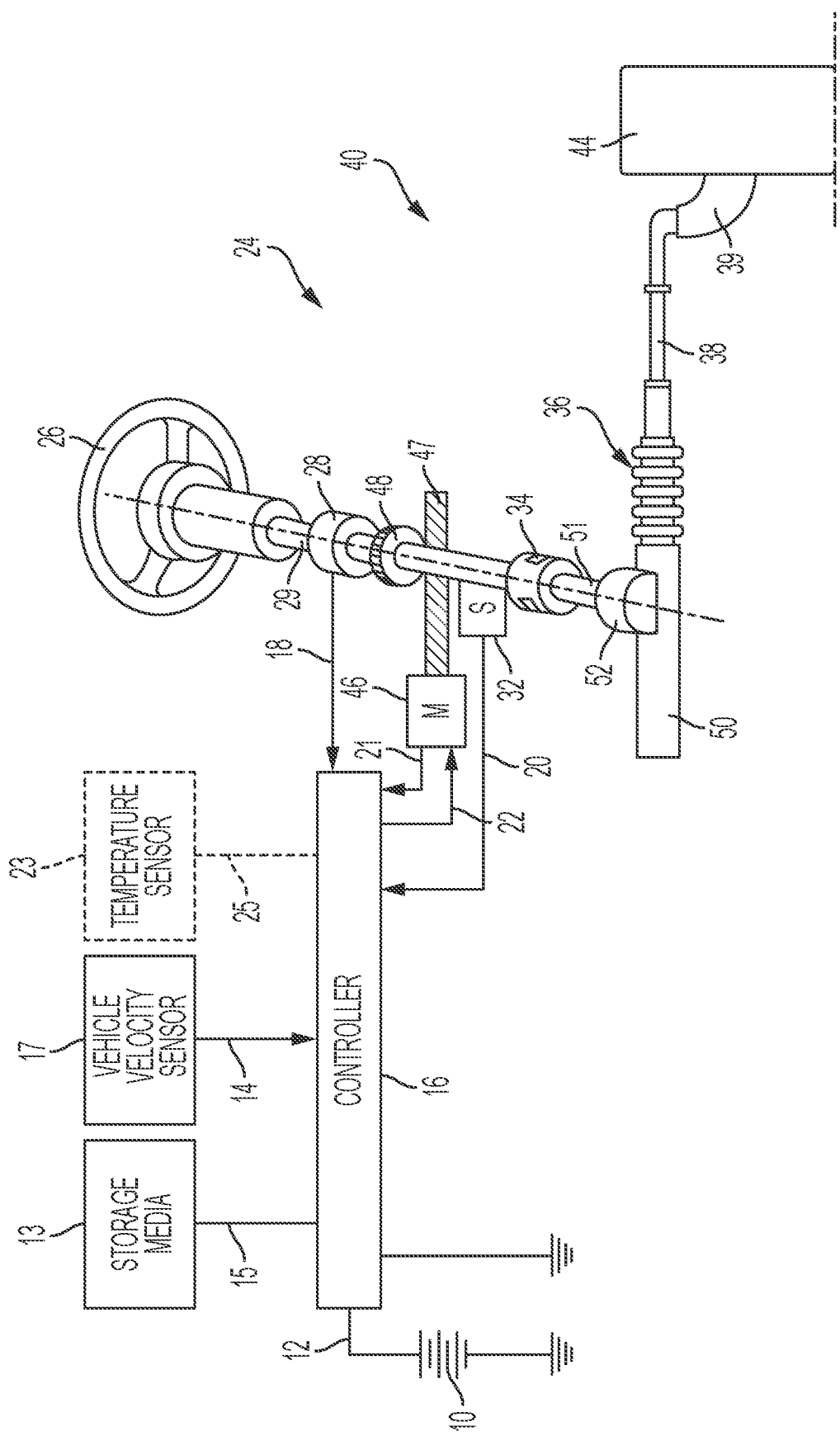
FIG. 1 is an exemplary embodiment of an EPS 40 in a vehicle 100 suitable for implementation of the disclosed embodiments.
Figure 2:
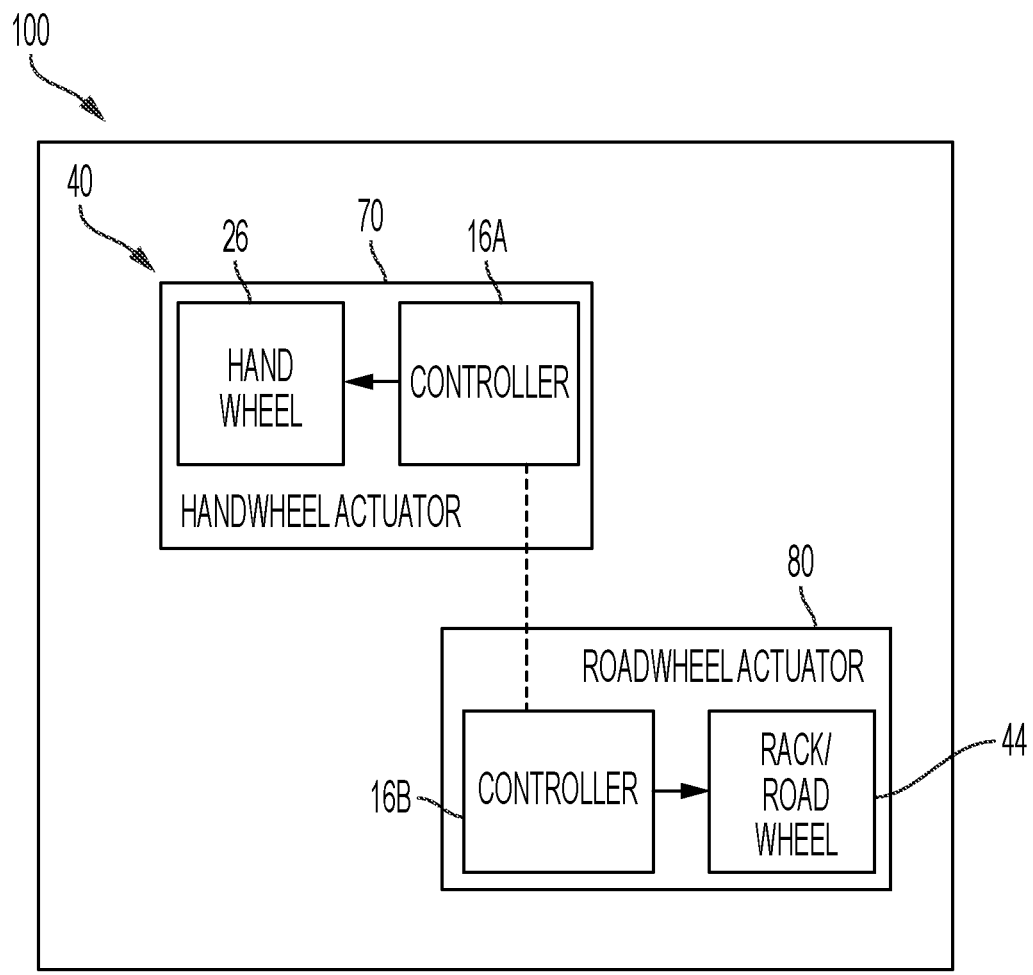
FIG. 2 is an exemplary embodiment of a SbW system 40 for implementation of the described embodiments.

The technical solutions described herein are applicable to both EPS (Electric Power Steering) and SbW (Steer-by-Wire) systems. Referring now to the Figures, where the technical solutions will be described with reference to specific embodiments, without limiting same, FIG. 1 is an exemplary embodiment of an EPS 40 in a vehicle 100 suitable for implementation of the disclosed embodiments, and FIG. 2 is an exemplary embodiment of a SbW system 40 for implementation of the described embodiments. Unless specifically described otherwise, the present document refers to a steering system 40 that can be either an EPS or a SbW or any other type of steering system in which the technical solutions described herein can be used.

In FIG. 1, the steering mechanism 36 is a rack-and-pinion type system and includes a toothed rack (not shown) within housing 50 and a pinion gear (also not shown) located under gear housing 52. As the driver input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown).

Electric power steering assist is provided through the control apparatus generally designated by reference numeral 24 and includes the controller 16 and an electric machine 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the handwheel 26 is turned, torque sensor 28 senses the torque applied to the handwheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 46 and the desired torque, the position and/or speed of the rotor and the torque applied by an driver are determined. A position encoder is connected to the lower steering shaft 51 to detect the motor position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the lower steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

FIG. 2 depicts an exemplary SbW system according to one or more embodiments. The SbW system 40 includes a handwheel actuator (HWA) 70 and a roadwheel actuator (RWA) 80. The controller 16 is split into two blocks, a controller 16A and a controller 16B associated with the HWA 70 and the RWA 80 respectively. In other examples, the controller 16 can be distributed in any other manner.

The HWA 70 includes one or more mechanical components, such as the handwheel 26 (steering wheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components.

The RWA 80 includes one or more mechanical components, such as a steering rack and/or pinion coupled to a motor/inverter through a ball-nut/ball-screw (gear) arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In one or more examples, the controllers 16A and 16B of the SbW system 40 communicate with each other through CAN interface (or other similar digital communication protocols). Guidance of the vehicle 100 that is fitted with the SbW system 40 is performed by use of the steering gear, with an input shaft that is rotated by the RWA 80, such as a servo actuator. The RWA 80 receives an electronic communication signal of rotation of the steering wheel by the driver. A driver controls the steering wheel to directionally control the vehicle 100. The angle from HWA 70 is sent to the RWA 80 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 70 that is coupled to the steering column and steering wheel simulates the driver's feel of the road. The HWA 70 may apply tactile feedback in the form of torque to the steering wheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system 40" herein refers to any type of steering system.

As noted herein, a technical challenge with steering systems is estimating tire load for vehicle dynamics control. Moreover, knowledge of tire load can be used to determine useful information of road surface friction, and for closed loop torque control of a steering system of the vehicle. Further, the tire load estimation can be used in steer-by-wire (SbW) type steering systems to generate handwheel torque, in addition to the disturbance rejection estimation in the steering system. Accordingly, it is desirable for a steering system to perform real time estimation of tire load for several operations. It should be noted that tires of a vehicle experience forces in vertical, longitudinal, and lateral direction during vehicle operation. These forces are reflected on rack of the steering system 40 based on suspension design in the vehicle 100. "Tire loads" as referred to herein are representative of tire forces reflected on rack of a steering system; and hence, are equivalent to rack forces coming from road or tire side of the vehicle 100.

Several existing techniques for estimating tire load in steering systems do exist. One or more existing techniques include using a steering system signal based observer to predict tire load, using system dynamics and a LuGre friction model. However, in such techniques, the effect of friction is considered to be same when driving against road loads as well as back-driving a motor of the steering system.

The electric motor 46 used in a motor assisted steering system 40, typically, provides at least two degrees of freedom: direction and acceleration. This manifests as four distinct quadrants of operation. It can be visualized by plotting the velocity of the motor 46 as the Y axis and the direction of applied torque as the X axis.

Figure 3:
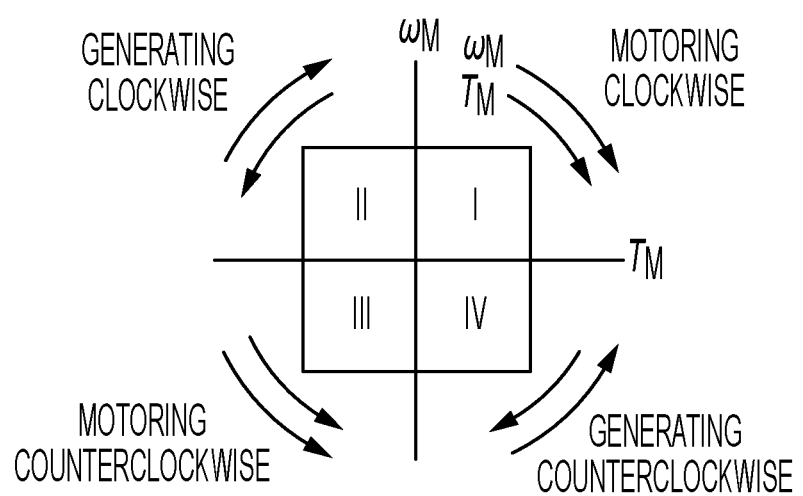
FIG. 3 depicts motor quadrants according to one or more embodiments.

FIG. 3 depicts motor quadrants according to one or more embodiments. Quadrants I and III signify the motor 46 applying torque in the direction of motion, while quadrants II and IV represent applying torque in the opposite direction. In quadrants I and III the flow of energy is from electrical to mechanical as in, the servo motor 46 is converting electrical power from the drive into motion in the system. Meanwhile, in quadrants II and IV, the motor 46 acts as a generator.

A steering system that uses worm-worm gear mechanism has the motor 46 coupled with the worm 47, which is in contact with worm gear, 48. The forward vs. backward drive efficiency can be different for a gear pair, such as worm-worm gear, and comes into effect in the signature of motor torque that is generated. The steering system 40 has at least one gear pair; for example, worm-worm gear, belt and ball gear, rack-pinion etc.

Figure 4:
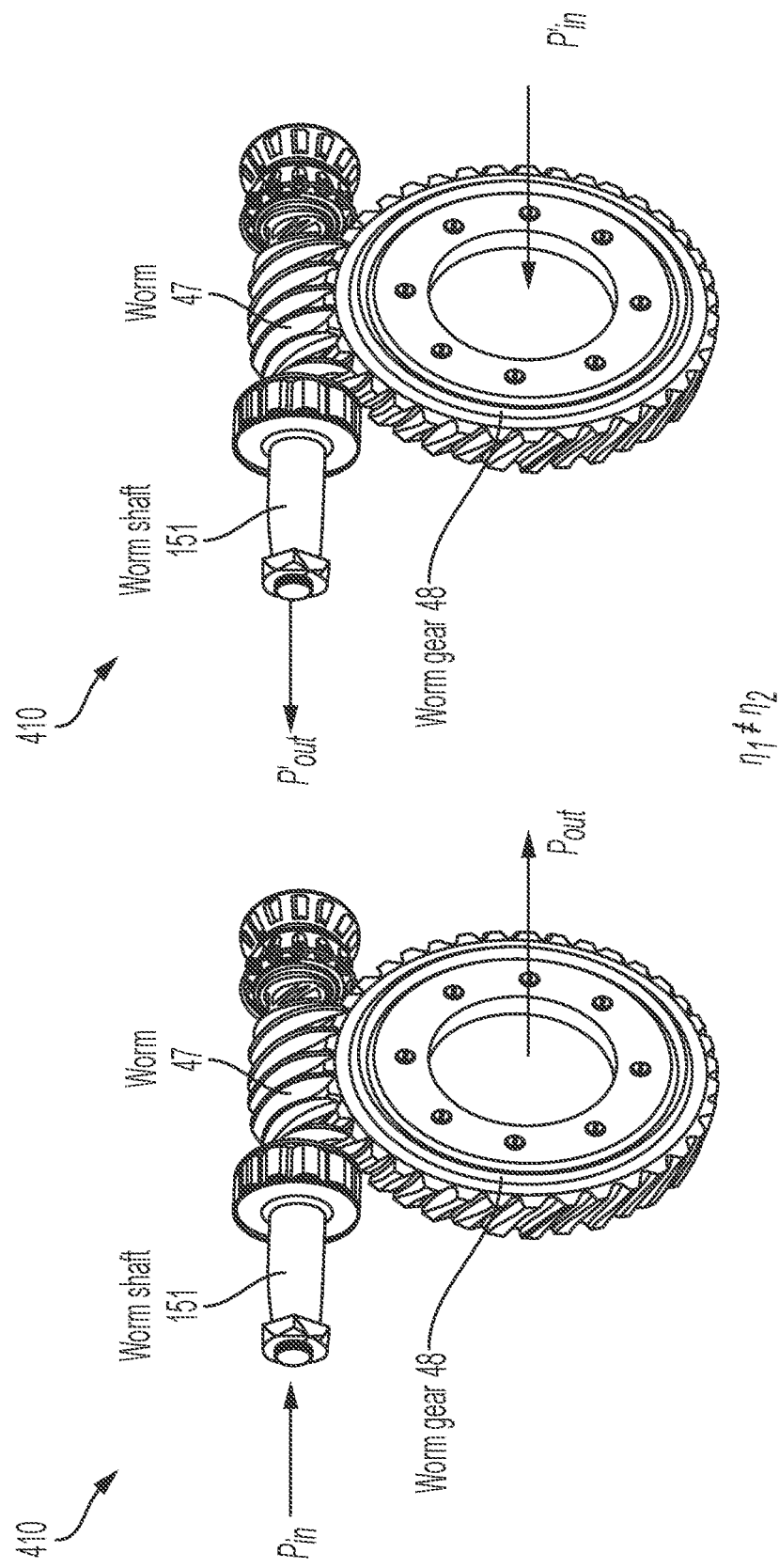
FIG. 4 shows exemplary a situation for a steering system with a worm-worm gear.

FIG. 4 shows exemplary a situation for a steering system with a worm-worm gear. It should be noted that although a worm-worm gear situation is depicted, the technical solutions described herein can be applicable for any other gear pair, such as rack-pinion. In FIG. 4, in case of the gear pair 410 the motor 46 is driving the worm shaft 151 with Pin torque being input to the worm shaft 151, consequently generating an output of Pout=$\eta 1 \times$Pin, where $\eta 1$ is a forward efficiency of the gear pair when operating from worm shaft 151 to worm gear 48.

However, in one or more situations (e.g. returning the handwheel 26 to handwheel center after completing maneuver, such as exiting a ramp), the tire load drives the steering system 40. In this case, the gear pair 410 experiences an input torque P'in at the worm gear 48, which is transferred to the motor in the form of a torque of P'out=η2×P'in, where η2 is a backward efficiency of the gear pair when operating from worm gear 48 to worm shaft 151.

Figure 5:
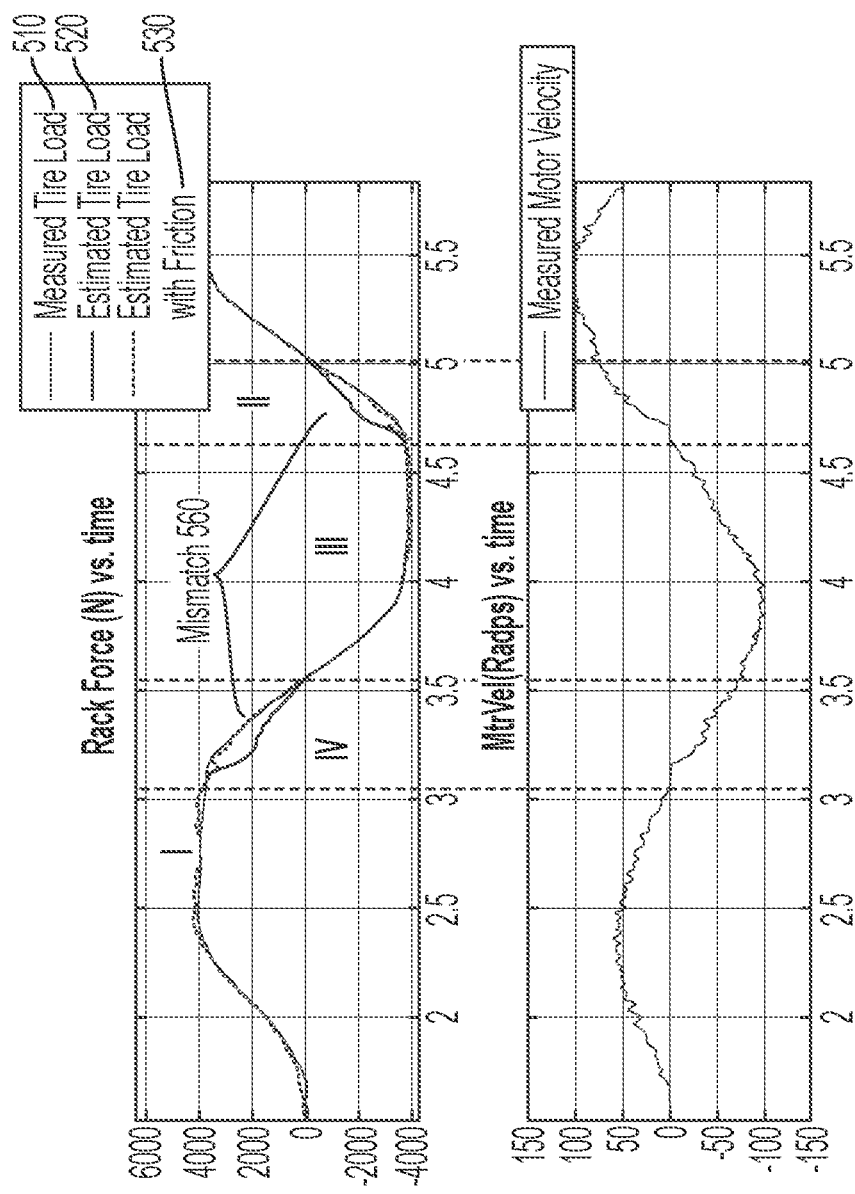
FIG. 5 depicts an example mismatch between tire load estimates and actual tire load in an exemplary scenario.

FIG. 5 depicts an example mismatch between tire load estimates and actual tire load in an exemplary scenario. Differences in the forward and backward efficiency can cause the the tire load estimates 520 and 530 that are generated using just a steering system state observer to mismatch actual tire load 510 during reversals (quadrants II and IV), when the motor 46 is a generator. In the example scenario depicted in FIG. 5, in the quadrants I and III, the estimated tire load 520, 530 substantially match the actual tire load 510.

The technical solutions described herein address such technical challenges of estimating the tire load estimate taking into account the difference in forward and backward efficiencies of one or more gear pairs in the steering system 40. In one or more examples, the technical solutions use a quadrant based efficiency model to replace a LuGre friction model typically used by tire load observers.

Figure 6:
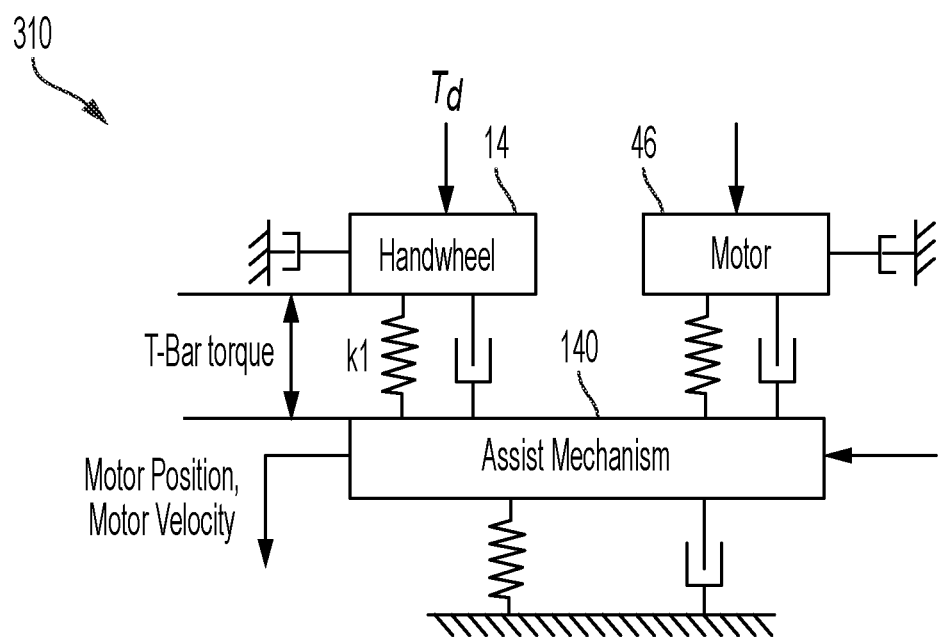
FIG. 6 illustrates example plant model of the steering system according to one or more embodiments.

FIG. 6 illustrates example plant model of the steering system according to one or more embodiments. In one or more examples, a state observer used for estimating the tire load can use a 2-mass plant model 310 of the steering system 40. The plant model 310 includes two inertias—Hand wheel (HW) and Assist-mechanism (AM) 140 respectively. The AM includes combined motor and rack inertia in a typical gear of the steering system 40. The steering rack is then linked to the road wheels by tie rods and the driver input is transferred to the steering rack by the steering wheel and steering column.

In the representation of the 2-mass linear model, driver torque ($T_d$) represent the two inputs to the system, while T-Bar torque ($T_{HW}$) motor position ($\theta_{AM}$) and motor velocity ($\dot\theta_{AM}$) represent the 3 outputs or measurements in the steering system 40. $T_{HM}$ is the torque across the torsion spring k1. The electric motor 46 is connected to the steering rack via a drive belt and a recirculating ball gear.

The 2-mass model can be reduced to a 1-mass ($J_{AM}$) model as both motor torque (Tm) and T-Bar Torque ($T_{HW}$) can be measured. Furthermore, it should be noted that modern steering systems such as steer-by-wire may not have handwheel coupled with rack through a mechanical connection; and hence, $T_{HW}$ can be set to zero. Such a 1-mass model may be applied to a rack based steer-by-wire system as well as independent actuator based steer-by-wire system. Typically, the amount of motor torque (Tm) to be applied is decided by various internal steering system algorithms and hence it is a known quantity. The amount of motor torque can also be calculated from measured current in the motor 46, if applicable. Accordingly, the equations for the 1-mass model can written as $$J_{AM}\ddot\theta_{AM}+b\dot\theta_{AM}=T_{HW}+T_m+d \quad \text{Equation (1)}$$

where $J_{AM}$ is the mass of the assist mechanism 140, b is a predetermined damping coefficient, and $\Theta_{AM}$ represents motor position of the motor 46 of the steering system 40. In the above equation, d represents the disturbance acting on the linear system. It typically includes the tire load ($d_{rack}$), and friction ($d_{friction}$) components.

Figure 7:
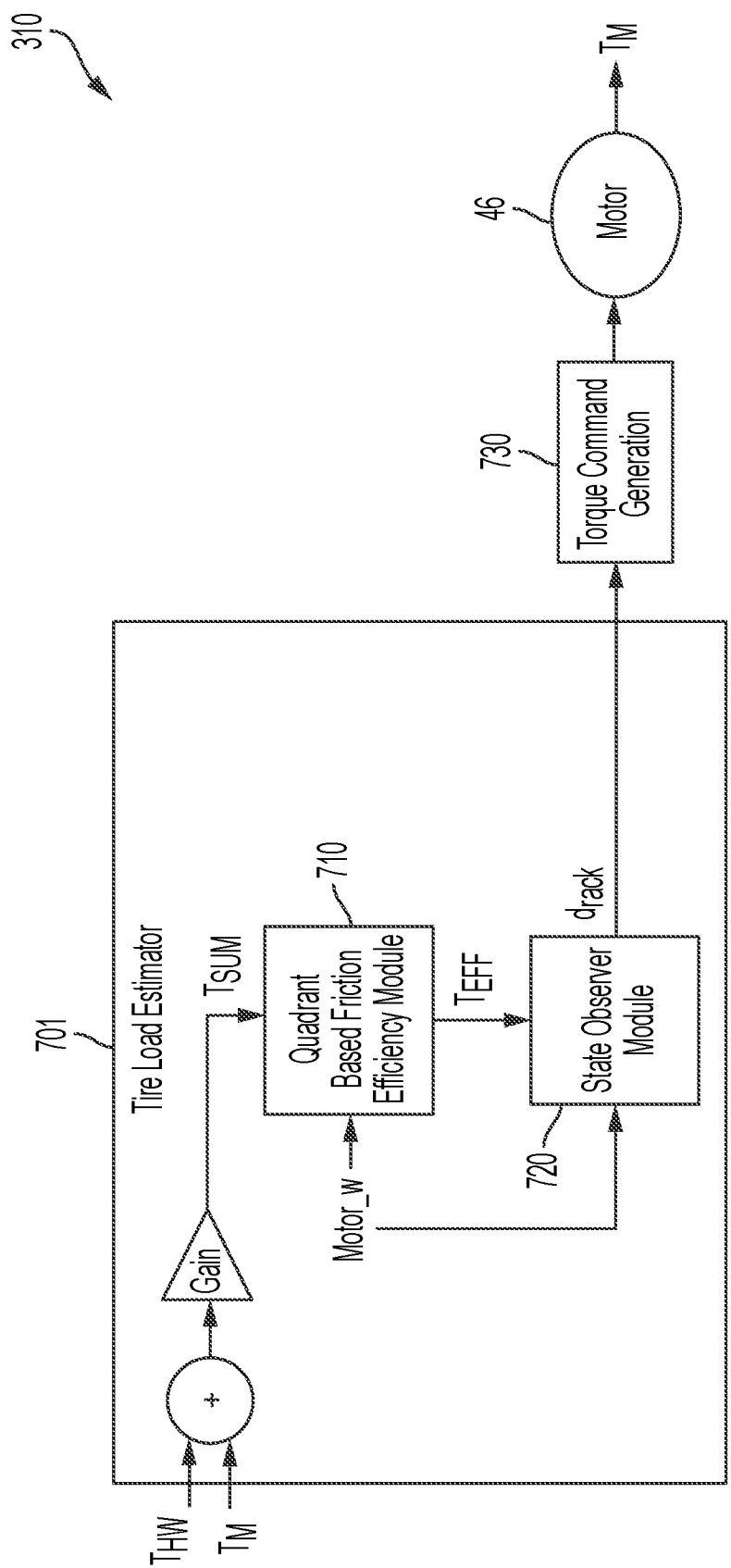
FIG. 7 depicts a control system for a steering system that estimates a tire load according to one or more embodiments.

FIG. 7 depicts a control system for a steering system that estimates a tire load according to one or more embodiments. The control system 310 includes a tire load estimator 701, a torque command generator 730, among other components. The estimated tire load that is output by the tire load estimator 701 is used for generating a torque command by the torque generation module 730. The torque command may be generated for providing an assist torque to the operator of the vehicle 100. For example, the assist torque may be a disturbance compensation torque to compensate for the tire load experienced by the steering system 40, for example because of a disturbance on the road, such as a bump, a pothole, or the like. The disturbance compensation torque prevents the operator from experiencing undesirable vibrations at the handwheel 26 during such events.

In case of a SbW 40, the torque command can be to generate a feeling for the operator of the road surface on which the vehicle 100 is being driven, in absence of the mechanical linkage between the HWA 70 and the RWA 80. The torque command, in such cases, generates a torque substantially equivalent to the tire load that is estimated. The torque command is applied to the motor 46, which generates a corresponding amount of torque. The torque command generation module 730 can include various components such as current regulator and the like, which are not shown.

The tire load estimator 701 includes a quadrant based friction efficiency module 710 that estimates a torque value $T_{EFF}$ according to one or more embodiments. The quadrant based friction efficiency module 710 takes addition (Tsum) of motor torque (Tm) and T-Bar torque ($T_{HW}$) along with motor velocity (Motor_w) as the inputs and outputs an $T_{EFF}$ which accounts for friction in the steering system 40. Hence, the equation (1) can be reduced to:

$$J_{AM}\ddot\theta_{AM}+b\dot\theta_{AM}=T_{eff}+d_{rack} \quad \text{Equation (2)}$$

Because of the adjusted form of the equation (2), a disturbance observer 720 can estimate the tire load $d_{rack}$, acting on the steering system 40. Such a state observer 720 is explained in detail later. The quadrant based friction efficiency module 710 is first described below.

Figure 8:
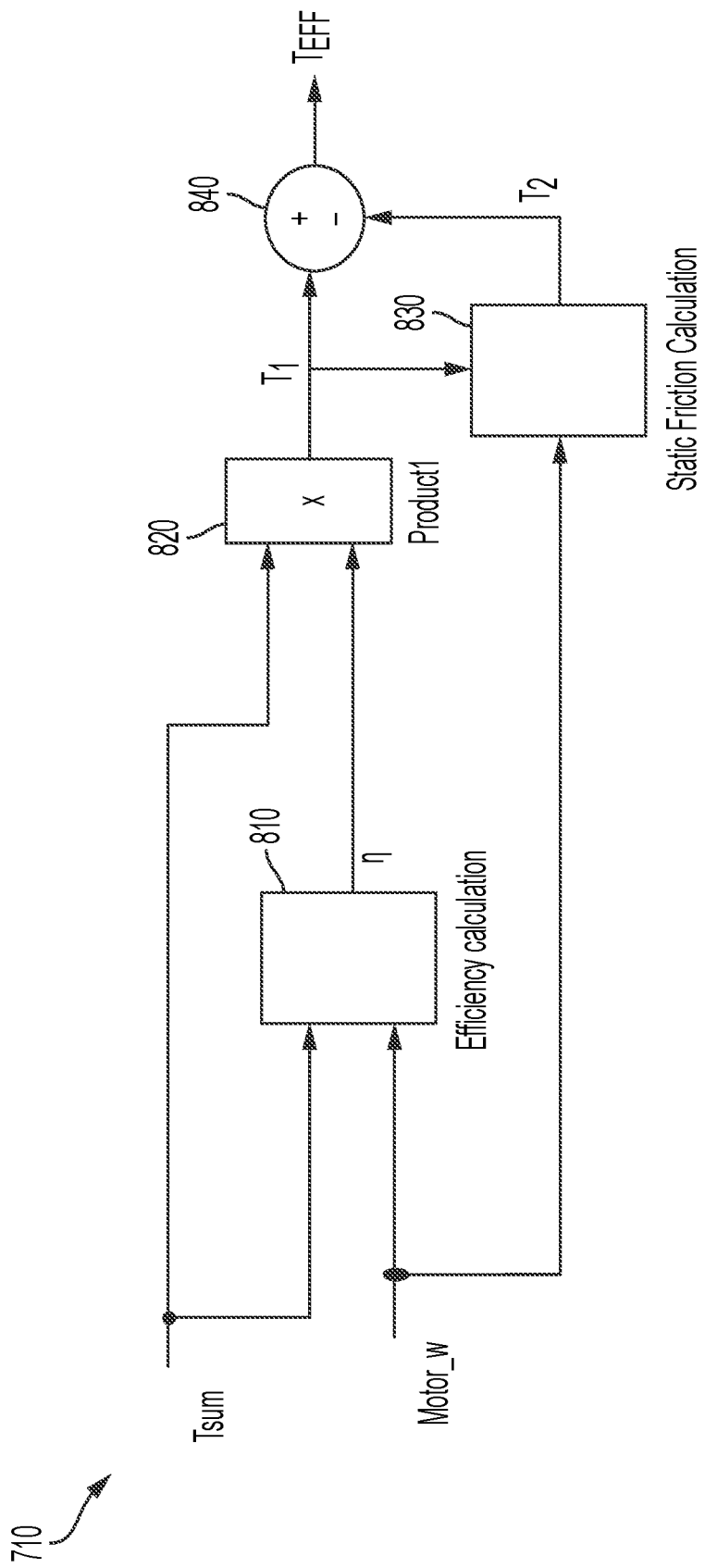
FIG. 8 depicts operation flow of one or more components of an example quadrant based friction efficiency module according to one or more embodiments.

FIG. 8 depicts operation flow of one or more components of an example quadrant based friction efficiency module according to one or more embodiments. The quadrant based friction efficiency module 710 computes the $T_{EFF}$ that accounts for friction in the steering system 40. As shown in FIG. 8, the quadrant based friction efficiency module 710 includes an efficiency parameter module 810 and a static friction module 830, among other components.

Figure 9:
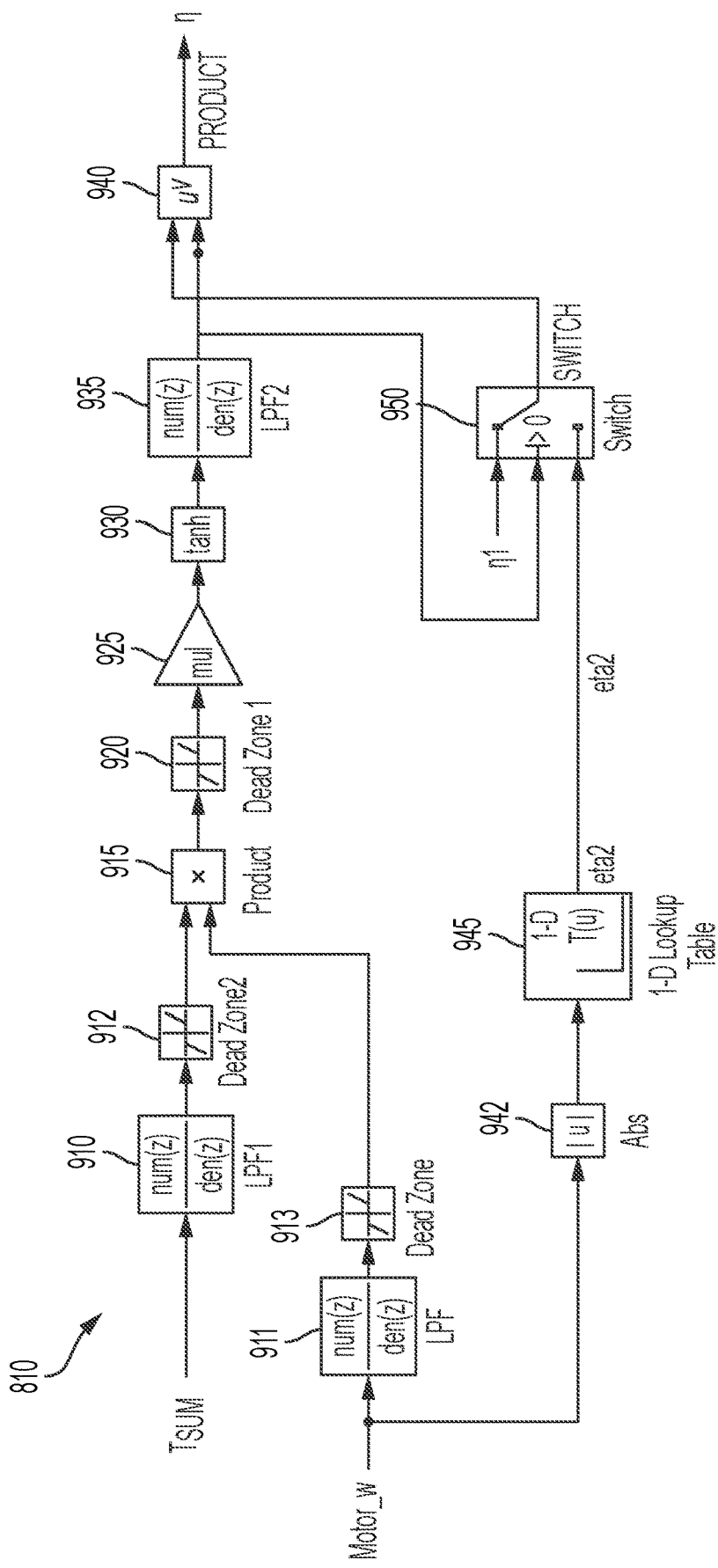
FIG. 9 depicts operation flow of one or more components of an example efficiency parameter module according to one or more embodiments.

FIG. 9 depicts operation flow of one or more components of an example efficiency parameter module according to one or more embodiments. The final output of the efficiency parameter module 810 is the efficiency parameter ($\eta$). The efficiency parameter module 810 calculates an efficiency ($\eta$) based on the input torque (Tsum) and motor velocity (Motor_w).

The Tsum is filtered using a low pass filter 910 and the filtered output is passed through a dead zone detection module 912. A dead zone detection module generates zero output within a specified region, called its dead zone. Outside the dead zone range, this module's output is input value offset by the dead zone range itself. The Motor_w is also passed through a low pass filter 911 and a dead zone detection module 913 and the output of the two dead zone modules 912, 913 are multiplied (915) and the resultant product is scaled using a predetermined gain factor by a gain module 925. In one or more examples, the product is also passed through a dead zone detection module 920 before being used.

The output from the gain module 925 is passed through a range limiter 930. The range limiter normalizes the output of the gain module 925 into a predetermined range. For example, the range limiter 930 uses a "tan h" function to limit the output of the gain module 925 in the range [−1, 1]. It should be noted that other types of range limiters, such as lookup tables, can be used in other embodiments. The input torque (Tsum) processed in this manner is passed through a low pass filter 935 before being used to estimate the efficiency factor (η) by computing $u^v$, where u=either a predetermined forward efficiency value (η1) or a backward efficiency value (η2), and v=output of the low pass filter 935, at block 940.

In conjunction, the motor_w is used to determine the backward efficiency (η2) of the gear pair. In one or more examples, a look up table 945 is used to determine η2 based on the motor_w. Additionally, in one or more examples, an absolute value (942) of the motor_w can be computed and used to access the look up table 945.

The resulting η2 is used as an input to a switch module 950, which also receives the η1 value as an input. Further, the switch module 950 receives the output of the range limiter 930 as a third input. The switch module 950 compares the normalized Tsum from the range limiter 930 with a predetermined threshold (for example, 0). In the depicted example, where the range limiter 930 normalizes the Tsum value into the [−1, 1] range, the switch module 950 compares the third input with 0, and outputs the forward efficiency ↓1 when the third input is greater than or equal to 0. Alternatively, the switch module 950 outputs the backward efficiency η2 when the third input is lesser than 0.

The output from the switch module 950 is used as an input to the block 940 the output of which is the efficiency η. The block 940 takes 2 inputs, and the output is second input power (or exponent) of first input. For example, if first input is η2, and second input is −1, the output is $\eta 2^{-1}$, i.e. inverse of η2, or 1/η2. Similarly, if first input is η1, and second input is 0.5, the output is $\eta 1^{0.5}$, or square root of of η1.

Referring back to FIG. 8, the efficiency η is used as an input to the multiplication module 820 to scale the input torque (Tsum) and obtain the first torque value $T_1$. Further, the first torque value $T_1$ and the motor velocity motor_w are used by the static friction module 830 to compute an estimated second torque value $T_2$.

Figure 10:
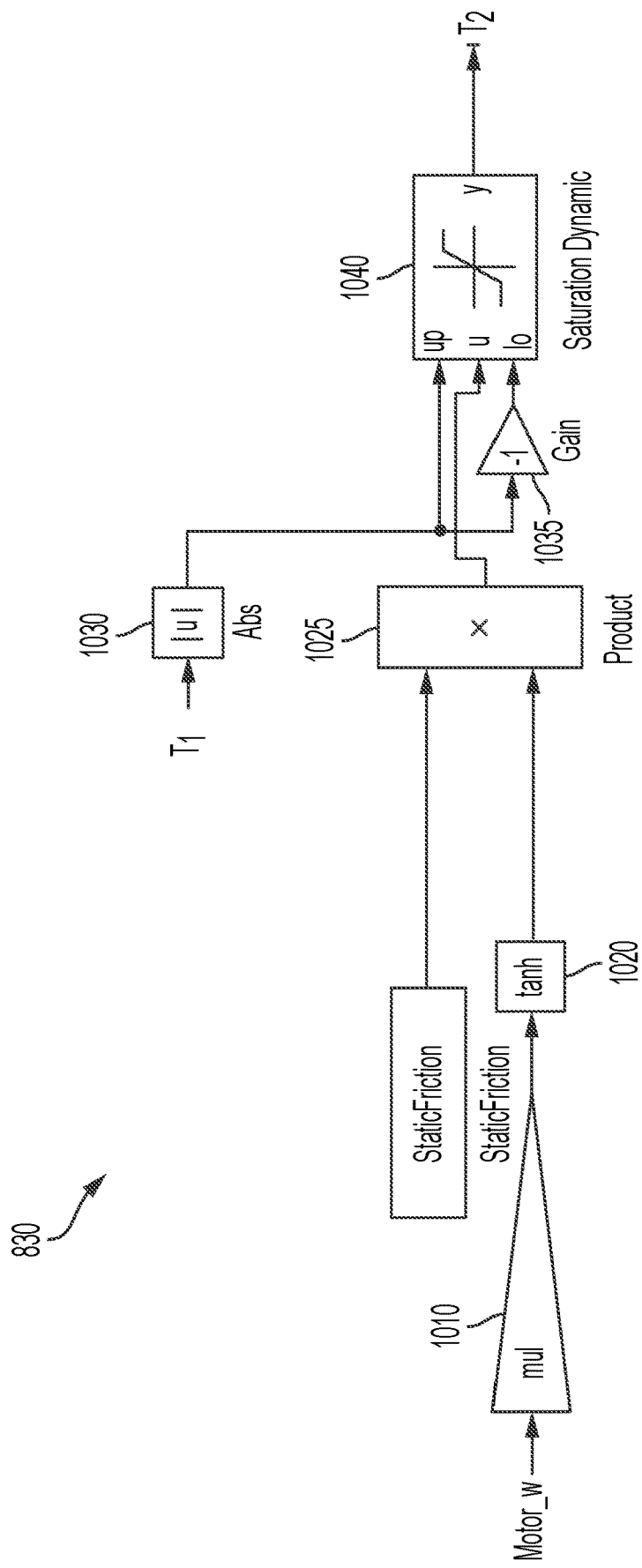
FIG. 10 depicts operation flow of one or more components of an example static friction module according to one or more embodiments.

FIG. 10 depicts operation flow of one or more components of an example static friction module according to one or more embodiments. The second torque value $T_2$ computed by the static friction module 830 estimates a static friction in the steering system 40. The motor_w is scaled (1010) and normalized (1020) using a gain module 1010 and a range limiter 1020. The range limiter 1020 can use tan h or any other range limiting technique based on a predetermined range to which the scaled motor_w is to be limited. In the depicted example, tan h is used to limit the value in the [−1, 1] range. The normalized value is used to scale a predetermined static friction coefficient using a multiplier module 1025. The resulting product is saturated within a dynamic range by a saturation block 1040. The dynamic range is based on the first torque value $T_1$ and is set to [−$T_1$, $T_1$] by computing an absolute value (1030) of $T_1$ and scaling it with a gain of −1 (1035). The output of the saturation block 1040 is the second torque value $T_2$.

Referring back to FIG. 8, the second torque value $T_2$ is subtracted (840) from the first torque value $T_1$ to compute the $T_{EFF}$. Further, referring to FIG. 7, the $T_{EFF}$ is used as input to the state observer 720 to estimate the $d_{rack}$.

As can be seen, $T_{EFF}$ accounts for the non-linear friction part and only the damping (b) and rack disturbance force ($d_{rack}$) act on the reduced inertia $J_{AM}$. The physical parameters ($J_{AM}$, b) of the 1-mass model are estimated based on frequency response based system identification by collecting data.

Figure 11:
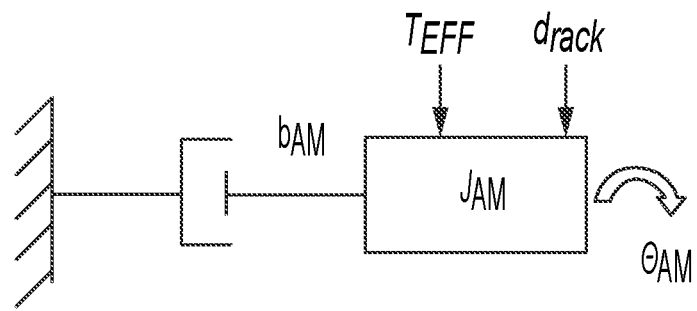
FIG. 11 depicts another state that is added to the state vector to signify the dynamics of a disturbance factor according to one or more embodiments.

FIG. 11 depicts another state that is added to the state vector to signify the dynamics of the disturbance, i.e. rack force or tire load. The one-mass model in the figure has two inputs, $T_{EFF}$ and $d_{rack}$, acting on it. The $d_{rack}$ is treated as an additional or extended system state. Since the tire load is unknown that is to be estimated, $d'_{rack}$ is set to zero. Hence, $\dot{\theta}_{AM}$, $d_{rack}$ are the two states of the observer 720. A mathematical expression is:

$$\begin{bmatrix} \ddot{\theta}_{AM} \\ \dot{d}_{rack} \end{bmatrix} = \begin{bmatrix} -b/J_{AM} & 1/J_{AM} \\ 0 & 0 \end{bmatrix} \begin{bmatrix} \dot{\theta}_{AM} \\ d_{rack} \end{bmatrix} + \begin{bmatrix} \frac{1}{J_{AM}} \\ 0 \end{bmatrix} T_{EFF}$$

$$y = \begin{bmatrix} 1 & 0 \end{bmatrix} \begin{bmatrix} \dot{\theta}_{AM} \\ d_{rack} \end{bmatrix}$$

$$A_{aug} = \begin{bmatrix} -\frac{b}{J_{AM}} & \frac{1}{J_{AM}} \\ 0 & 0 \end{bmatrix}$$

$$B_{aug} = \begin{bmatrix} \frac{1}{J_{AM}} \\ 0 \end{bmatrix}$$

$$C_{aug} = \begin{bmatrix} 1 & 0 \end{bmatrix}$$

$$D_{aug} = \begin{bmatrix} 0 \\ 0 \end{bmatrix}$$

Figure 12:
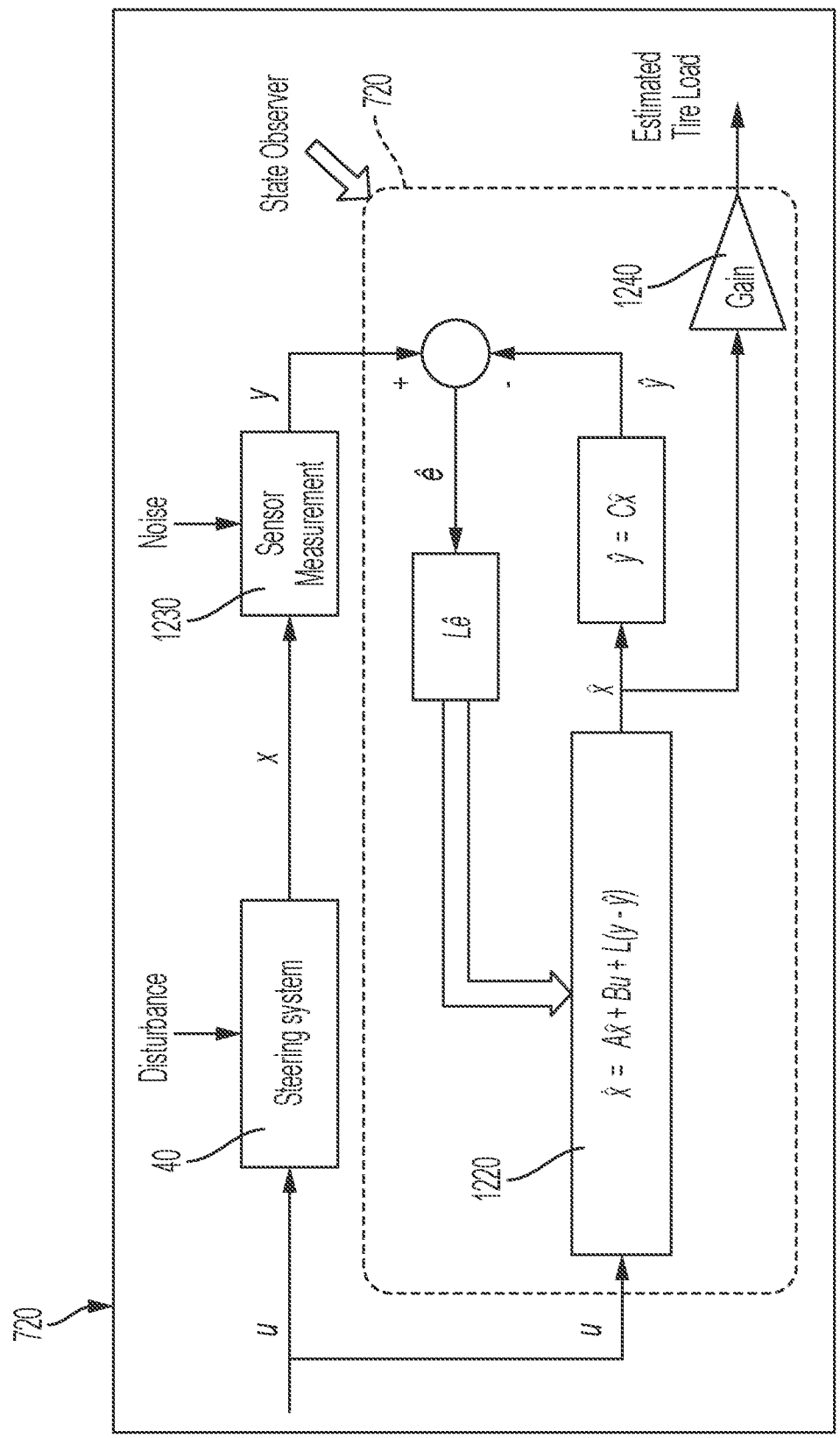
FIG. 12 depicts an operation of an example state observer according to one or more embodiments.

FIG. 12 depicts an operation of an example state observer according to one or more embodiments. The final output of the observer is estimated tire load, 1240, indicated as $\hat{d}_{rack}$ in the equations below. The state observer 720 operates according to the observer equations:

$$\dot{\hat{X}} = A_{aug}\hat{X} + B_{aug}u + L(y - \hat{y})$$

$$\dot{\hat{X}} = A_{aug}\hat{X} + B_{aug}u + L(y - C_{aug}\hat{X})$$

$$\dot{\hat{X}} = (A_{aug} - LC_{aug})\hat{X} + B_{aug}u + Ly$$

$$\dot{\hat{X}} = (A_{aug} - LC_{aug})\hat{X} + \begin{bmatrix} B_{aug} & L \end{bmatrix} \begin{bmatrix} u \\ y \end{bmatrix}, \text{where}$$

$u = T_{EFF}$ and $y = \dot{\theta}_{AM}$

Observer extended state, $X = \begin{bmatrix} \dot{\theta}_{AM} \\ d_{rack} \end{bmatrix}$ Estiamted state, $\hat{X} = \begin{bmatrix} \dot{\hat{\theta}}_{AM} \\ \hat{d}_{rack} \end{bmatrix}$ $A_{obs} = A_{aug} - LC_{aug}$ $B_{obs} = \begin{bmatrix} B_{aug} & L \end{bmatrix}$ $\hat{y} = C_{aug}\hat{X}$ $\hat{d}_{rack} = \text{Gain} \cdot \hat{y}$, where Gain = $\begin{bmatrix} 0 & 1 \end{bmatrix}$ The observer matrix L can be determined using LQE (Linear quadratic estimator) or Kalman filter approach by assigning weights on disturbance inputs and noise on measured outputs. The observer 720 uses the state-space equation form of the steering system 40 described above and a feedback term. The measured output y from one or more sensors (1230) is compared to the estimated output from the plant model (1220) in order to update the state vector estimate using a feedback term. This feedback term is calculated by multiplying the error term e, with the observer gain, L. in one or more examples, the technique used to design L is steady state Kalman filtering, which is known method to design observers in control systems [Gene F. Franklin, J. David Powell, and Abbas Emami-Naeini. " Feedback control of dynamics systems." Pretince Hall Inc (2006); Gene F. Franklin, J. David Powell, and Michael L. Workman. Digital control of dynamic systems. Vol. 3. Menlo Park: Addison-wesley, 1998.]. L is a matrix that is designed to drive the error to zero, and therefore cause the estimated states to approach the values of the actual states. The state observer 720 uses a plant model 1220, such as the 1-mass model described herein, or any other model of the steering system 40. The estimated value from the plant, once the gain matrix is configured as described herein, can be used as an estimate of the tire load ($d_{rack}$). In one or more examples, the output from the plant is scaled by a gain module 1240 to determine the tire load.

The tire load estimation model provided by the technical solutions described herein provides improved and consistent prediction of tire load compared to a linear observer with Lugre Friction Model or the like. Further, when the friction compensated tire load estimate described herein is used in steering systems such as steer by wire or closed loop torque control type steering systems, it greatly accentuates road feedback with higher accuracy than estimates without such friction compensation.

Accordingly, the technical solutions described herein facilitate accounting for friction based efficiency loss in a steering gear. By accounting for asymmetric efficiency, accuracy of the tire load estimation is improved. The accuracy is improved because of the use of different efficiency/friction for forward ($\eta_1$) and backward ($\eta_2$) drive in the steering gear. The backward efficiency is computed as a function of motor velocity, for example by using a lookup table. Further yet, during computing the tire load estimate, the system switches between using the forward efficiency and the backward efficiency as a function of assist torque, handwheel torque, and motor velocity. For example, the net assist torque and motor velocity parameters, after being passed though respective low-pass filters, and deadzone modules, are multiplied and a smoothing function applied to switch between efficiencies based on the output. The modified assist torque using the efficiency computed in this manner is used as an input to linear/Luenberger state observer to obtain the tire load estimation.

Further, it should be noted that the accurate tracking of the estimated tire load is not only because of the good parametrisation of the observer, but also because of the improved friction estimation module. The friction estimation module uses static friction in addition to performing a calculation based on the asymmetric efficiency being accounted for.

The technical solutions accordingly provide a technique to account for friction based efficiency loss in a steering gear. By accounting for asymmetric efficiency, the technical solutions improve a prediction of a tire load. Accurate tracking of estimated tire load is facilitated not only because of the good parametrisation of the observer, but also due to the friction estimation module.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:
1. A control system for a steering system, comprising:
a control module operable to estimate a tire load by performing a method comprising:
receiving, as an input torque, motor-torque that is generated by a motor of the steering system;

computing an efficiency factor for a gear of the steering system based on the input torque and an angular motor velocity;
adjusting the input torque by scaling the input torque with the efficiency factor; and
estimating the tire load based on the adjusted input torque.

2. The control system of claim 1, wherein the input torque further comprises a handwheel torque that is added into the motor-torque.

3. The control system of claim 1, further comprising:
estimating a static friction in the steering system based on the angular motor velocity and the adjusted input torque;
computing a second adjusted torque by subtracting the static friction from the adjusted torque; and
using the second adjusted torque as the input to a plant model.

4. The control system of claim 1, wherein computing the efficiency factor for the gear is based on detecting an operational quadrant of the gear with respect to the input torque and the angular motor velocity.

5. The control system of claim 1, wherein computing the efficiency factor comprises:
determining a first value by multiplying the input torque and the angular motor velocity; and
selecting the efficiency factor from among a forward efficiency factor and a backward efficiency factor based on a comparison of the first value with a predetermined threshold.

6. The control system of claim 5, wherein computing the efficiency factor further comprises:
computing $u^v$, where u is the efficiency factor and v is the first value.

7. The control system of claim 5, wherein the backward efficiency factor is determined based on the angular motor velocity.

8. The control system of claim 1, wherein the steering system is a steer by wire system, and the control module is further operable to compute a handwheel torque for providing driver feedback based on the estimated tire load.

9. The control system of claim 1, wherein the control module is further operable to compute a disturbance adjustment torque command to generate a corresponding amount of torque using the motor of the steering system, the disturbance adjustment torque command computed based on the estimated tire load.

10. A method to estimate a tire load in a steering system, the method comprising:
receiving, as an input torque, motor-torque that is generated by a motor of the steering system;
computing an efficiency factor for a gear of the steering system based on the input torque and an angular motor velocity;
adjusting the input torque by scaling the input torque with the efficiency factor; and
estimating the tire load based on the adjusted input torque.

11. The method of claim 10, wherein the input torque further comprises a handwheel torque that is added into the motor-torque.

12. The method of claim 10, further comprising:
estimating a static friction in the steering system based on the angular motor velocity and the adjusted input torque;
computing a second adjusted torque by subtracting the static friction from the adjusted torque; and
using the second adjusted torque as the input to a plant model.

13. The method of claim 10, wherein computing the efficiency factor for the gear is based on detecting an operational quadrant of the gear with respect to the input torque and the angular motor velocity.

14. The method of claim 10, wherein computing the efficiency factor comprises:
determining a first value by multiplying the input torque and the angular motor velocity;
selecting the efficiency factor from among a forward efficiency factor and a backward efficiency factor based on a comparison of the first value with a predetermined threshold; and
computing $u^v$, where u is the efficiency factor and v is the first value.

15. The method of claim 14, wherein the backward efficiency factor is determined based on the angular motor velocity.

16. A steering system comprising:
a steering gear;
a processor configured to compute a tire load estimate by performing a method comprising:
receiving, as an input torque, motor-torque that is generated by a motor of the steering system;
computing an efficiency factor for a gear of the steering system based on the input torque and an angular motor velocity;
adjusting the input torque by scaling the input torque with the efficiency factor; and
estimating the tire load based on the adjusted input torque.

17. The steering system of claim 16, wherein the input torque further comprises a handwheel torque that is added into the motor-torque.

18. The steering system of claim 16, the method further comprising:
estimating a static friction in the steering system based on the angular motor velocity and the adjusted input torque;
computing a second adjusted torque by subtracting the static friction from the adjusted torque; and
using the second adjusted torque as the input to a plant model.

19. The steering system of claim 16, wherein computing the efficiency factor comprises:
determining a first value by multiplying the input torque and the angular motor velocity; and
selecting the efficiency factor from among a forward efficiency factor and a backward efficiency factor based on a comparison of the first value with a predetermined threshold; and
computing $u^v$, where u is the efficiency factor and v is the first value.

20. The steering system of claim 19, wherein the backward efficiency factor is determined based on the angular motor velocity.

* * * * *